(12) United States Patent
Chretien et al.

(10) Patent No.: US 9,979,328 B1
(45) Date of Patent: May 22, 2018

(54) DUAL-DRIVE ELECTRIC MOTOR CONTROL SYSTEM AND METHODS FOR HYBRID OPERATION OF ELECTRIC MOTORS

(71) Applicant: Regal Beloit America, Inc., Beloit, WI (US)

(72) Inventors: Ludovic Andre Chretien, Columbia City, IN (US); Roger Carlos Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days. days.

(21) Appl. No.: 15/335,287

(22) Filed: Oct. 26, 2016

Related U.S. Application Data

(63) Continuation of application No. 15/334,202, filed on Oct. 25, 2016, now abandoned.

(51) Int. Cl.
| | |
|---|---|
| *H02P 1/24* | (2006.01) |
| *G01M 1/38* | (2006.01) |
| *H02P 5/74* | (2006.01) |
| *H02P 27/08* | (2006.01) |
| *F24F 11/00* | (2018.01) |

(52) U.S. Cl.
CPC ............. *H02P 5/74* (2013.01); *H02P 27/08* (2013.01); *F24F 11/006* (2013.01)

(58) Field of Classification Search
None
See application file for complete search history.

(56) References Cited

U.S. PATENT DOCUMENTS

| | | | |
|---|---|---|---|
| 6,246,207 B1 | 6/2001 | VanSistine et al. | |
| 8,981,705 B2 | 3/2015 | Ramu | |
| 2003/0155875 A1* | 8/2003 | Weinmann | H02P 5/74 318/110 |
| 2004/0067049 A1* | 4/2004 | Woodward | B60H 1/00428 388/801 |
| 2006/0061321 A1 | 3/2006 | Han et al. | |
| 2006/0097687 A1 | 5/2006 | Byrnes, Jr. et al. | |
| 2009/0228147 A1* | 9/2009 | Lim | F24F 11/006 700/275 |
| 2011/0234134 A1 | 9/2011 | Ramu | |

* cited by examiner

*Primary Examiner* — Bentsu Ro
*Assistant Examiner* — Zemenay Truneh
(74) *Attorney, Agent, or Firm* — Armstrong Teasdale LLP

(57) ABSTRACT

A dual-drive electric motor control system configured to drive a first electric motor and a second electric motor is provided. The system includes a shared front-end motor drive circuit for converting AC input voltage from an AC voltage source to a DC-link voltage. A first control system has a first inverter coupled to the shared front-end motor drive circuit, and a first switch device configured to couple the AC voltage source directly to the first electric motor. The system further includes a second control system having a second inverter coupled to the shared front-end motor drive circuit, and a second switch device configured to couple the AC voltage source directly to the second electric motor.

19 Claims, 9 Drawing Sheets

DUAL-DRIVE ELECTRIC MOTOR CONTROL SYSTEM AND METHODS FOR HYBRID OPERATION OF ELECTRIC MOTORS

CROSS-REFERENCE TO RELATED APPLICATIONS

This application is a continuation of U.S. patent application Ser. No. 15/334,202, filed on Oct. 25, 2016, which is incorporated herein by reference in its entirety.

BACKGROUND OF THE DISCLOSURE

The field of the invention relates generally to electric motors, and more specifically to a control system for hybrid operation of permanent split capacitor (PSC) motors.

At least some known variable speed compressor drive circuits use a permanent magnet (PM) motor and an inverter to operate the PM motor at variable speeds. However, the inverter may reduce motor efficiency by up to 6% at full load, may require power factor correction when operated at full power, and must be sized for extreme operating conditions to handle very hot climates. PSC motors on the other hand are slightly less efficient than PM motors but do not require an inverter at full load. They inherently have high power factor and low electromagnetic interference (EMI). However, PSC motors only operate at one speed. When operated at low load conditions, such PSC motors cannot reduce their speed to match the load demand, and render the system less efficient overall. Variable speed motor controllers exist that adapt motor speed for PSC motors to the load level, but the overall system suffers in term of full load efficiency due partly to the losses in the electronics, starting torque production, as well as power factor and electromagnetic interference

BRIEF DESCRIPTION OF THE DISCLOSURE

In one aspect, a dual-drive electric motor control system configured to drive a first electric motor and a second electric motor is provided. The system includes a shared front-end motor drive circuit for converting AC input voltage from an AC voltage source to a DC-link voltage. A first control system has a first inverter coupled to the shared front-end motor drive circuit, and a first switch device configured to couple the AC voltage source directly to the first electric motor. The system further includes a second control system having a second inverter coupled to the shared front-end motor drive circuit, and a second switch device configured to couple the AC voltage source directly to the second electric motor.

DETAILED DESCRIPTION OF THE DISCLOSURE

Figure 1:
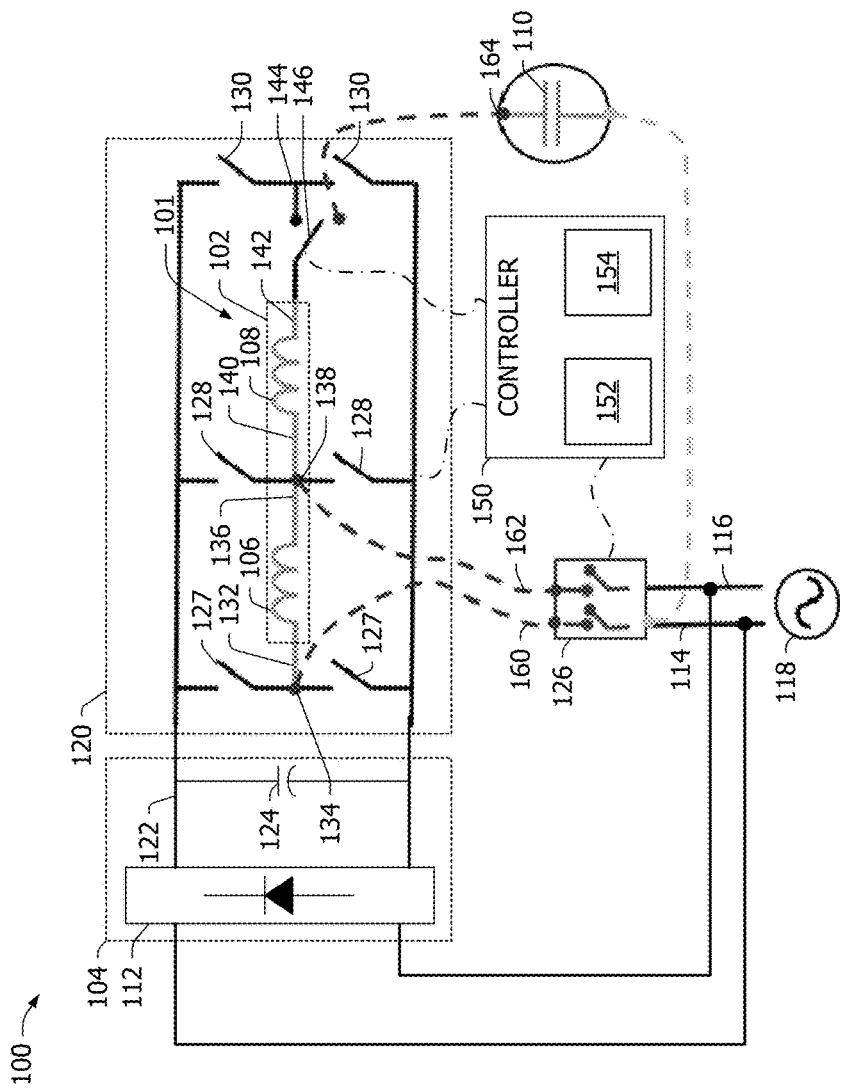
FIG. 1 is a circuit diagram of a control system for a PSC motor.

FIG. 1 is a block diagram of a control system 100 for a compressor 101 that may be used in an HVAC system. In the exemplary embodiment, compressor 101 includes a permanent split capacitor (PSC) motor 102 for driving compressor 101. PSC motors typically only drive compressors at one speed at full load and accordingly, do not require a drive circuit. However, in the exemplary embodiment, control system 100 provides for direct connection to alternating current (AC) line voltage for operation at full load and for connection to a front-end drive circuit 104 for operation at less than full load and at variable speeds.

More specifically, PSC motor 102 includes a main winding 106, a start winding 108, and a first capacitor 110. Drive circuit 104 includes a rectifier 112 configured to receive AC line voltage to first and second input terminals 114 and 116 from an AC line voltage source 118, an inverter 120 coupled downstream from rectifier 112, a direct current (DC) link 122 defined between rectifier 112 and inverter 120, a DC link capacitor 124 coupled across DC link 122, a first switch device 126 configured to selectively couple the AC line voltage to the main and common terminals of PSC motor 102, and a controller 150 configured to control operation of drive circuit 104 to drive PSC motor 102.

In the exemplary embodiment, drive circuit 104 receives the AC line voltage at first and second input terminals 114 and 116 from AC voltage source 118, such as a utility. Rectifier 112 is configured to rectify the AC line voltage received at first and second input terminals 114 and 116 to DC power. DC link capacitor 124 stores the DC power on DC link 122 and provides a DC link voltage to inverter 120. In the exemplary embodiment, DC link capacitor 124 has a capacitance that enables it to substantially maintain the voltage on DC link 122 to a DC value.

Inverter 120 is a 3-phase inverter and includes first switches 127 associated with a first inverter phase, second switches 128 associated with a second inverter phase, and third switches 130 associated with a third inverter phase of 3-phase inverter 120. In the exemplary embodiment, main winding 106 of motor 102 includes a first side 132 coupleable to a common node 134 between first switches 127 (also referred to as "first phase output 134") and a second side 136 coupleable to a common node 138 between second switches 128 (also referred to as "second phase output 138"). Moreover, in the exemplary embodiment, start winding 108 of motor 102 is coupled at a first side 140 to second phase output 138 and at a second side 142 a relay 146 (or any other device suitable to transmit or interrupt power) that selectively couples start winding's 108 terminal 142 to the third phase output 144 by controller 150 to a common node 144 between third switches 130 (also referred to as "third phase output 144") of inverter 120, or to terminal 164 of first capacitor 110. Based on signals received from controller 150, inverter 120 is configured to convert the DC link voltage to a two-phase AC output voltage for driving motor 102 to optimize machine efficiency.

First switch device (that could be made of two independent switches) 126 is coupled to first and second input terminals 114 and 116, and is coupled in parallel to the output of inverter 120. More specifically, first switch device 126 is, for example, a two-pole contactor that is coupled to first and second input terminals 114 and 116 on an input side, and further includes first and second output terminals 160 and 162 coupled across main winding 106. More specifically, first output terminal 160 is coupled to first side 132 of main winding 106 and second output terminal 162 is coupled to second side 136 of main winding 106.

Additionally, first capacitor 110 is coupled to first input terminal 114. Relay 146 selectively couples start winding 108 second side 142 to a second side 164 of first capacitor 110. In the exemplary embodiment, when PSC motor 102 is operating at full load, first switch device 126 is operated by controller 150 to selectively couple the AC line voltage from AC line voltage source 118 directly to main winding 106. When first switch device 126 is closed, controller 150 also controls relay 146 to couple start winding 108 second side 142 to first capacitor 110. The positioning of relay 146 enables first capacitor 110 to be moved outside of the motor winding connection, which facilitates operation of the two-phase PSC motor 102 using three-phase inverter 120 without having to bypass or short first capacitor 110, and enables maximum torque production of the PSC at any frequency or speed.

In alternative embodiments, first switch device 126 and relay may be any suitable switching device, including, for example, and without limitation, electromechanical relays, TRIACS, arrangement of SCRs, solid state relays, and other power electronics that can transmit and interrupt power. AC line voltage source 118 provides an AC line voltage signal, such as, for example 60 Hertz 240 Volt. In alternative embodiments, AC line voltage source 118 may provide other frequencies and voltages according to the grid requirements for that particular implementation. For example, certain countries utilize 50 Hertz as a line frequency. Similarly, certain countries utilize 120 Volt as a line voltage. AC line voltage source 118 may include a terminal block or bus configured to provide line voltage. In certain embodiments, AC line voltage source 118 may include a main system relay configured to switch AC line voltage to compressor 101, for example.

In the exemplary embodiment, controller 150 includes a processor 152 and a memory device 154. In the exemplary embodiment, controller 150 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, controller 150 is constructed of software and/or firmware embedded in one or more processing devices. In this manner, controller 150 is programmable, such that instructions, intervals, thresholds, and/or ranges, etc. may be programmed for a particular motor 102 and/or an operator of motor 102. Controller 150 may be wholly or partially provided by discrete components, external to one or more processing devices.

In operation, controller 150 determines whether to open or close first switch device 126 based on a frequency commanded by PSC motor 102 or a commanded motor reference point (e.g., a speed setting). Controller 150 is configured to receive a frequency commanded for PSC motor 102 and compare it to a predetermined range of line input power frequencies. Controller 150 is configured to activate or close first switch device 126 when the frequency commanded for motor 102 indicates a full loading on PSC motor 102. Closing first switch device 126 couples first and second input terminals 114 and 116 directly across main winding 106. Controller 150 also switches relay 146 to couple start winding 108 second side 142 to first capacitor 110, bypassing drive circuit 104. As used herein, a "PSC mode" of operation is when line input power is applied directly to PSC motor 102. When operating in PSC mode, motor 102 is operated at a substantially fixed speed according to a frequency of the line input power.

Additionally or alternatively, controller 150 is configured to open first switch device 126 when the frequency commanded for PSC motor 102 is not within the predefined range of line input power frequencies, or indicates a partial loading on PSC motor 102. Opening first switch device 126 causes AC line voltage from AC line voltage source 118 to be conditioned by drive circuit 104 and inverter 120 for driving PSC motor 102 at variable speeds. As used herein, a "drive mode" of operation is when inverter 120 provides conditioned power to motor 102. When operating in drive mode, controller 150 uses pulse width modulation (PWM) to control the switches of inverter 120, which enables variable speed control of motor 102.

Control system 100 combines the low speed operating points, soft starting, and controlled acceleration benefits of a variable speed drive circuit with the line operable, increased power factor, and reduced electromagnetic interference (EMI) signature benefits of a fixed speed PSC motor to improve overall system operation. More specifically, rather than drive motor 102 at a nominal 60 Hz regardless load demand, control system 100 adjusts to lighter loads by reducing the speed of PSC motor 102. Drive circuit 104 and inverter 120 are provided to control motor 102 at variable speeds to adapt to changing loads, especially in lower output power ranges where fixed-speed PSC motors are typically less efficient. Further, at higher output power ranges, the drive mode of drive circuit 104 may have a reduced power factor, increased EMI signatures, and/or electronic losses. When the frequency commanded by PSC motor 102 is within the predefined range of line input power frequencies or is at a full loading, control system 100 switches from drive mode to PSC mode. By switching between drive mode and PSC mode, control system 100 provides technical effects including high PF, low EMI, high efficiency, variable speed operation, and control of the starting acceleration. Further, a size of drive circuit 104 may be reduced because drive circuit 104 does not have to operate at full power.

By using inverter 120 to drive PSC motor 102 in drive mode when the motor commanded frequency is not within the predetermined range of line input power frequencies, drive circuit 104 reduces inrush current, enables soft starting of motor 102, and enables controlled acceleration of motor 102 during startup. More specifically, controller 150 modulates a duty cycle of the switches of inverter 120 to produce motor currents to maximize torque produced by motor 102 during startup. Further, controller 150 is configured to adjust stator frequency of motor 102 to minimize torque pulsation and apply a predetermined acceleration ramp rate. Alternatively, controller 150 is configured to adjust stator frequency by monitoring motor current and adjusting a ramp rate to remain below a predetermined limit.

Control system 100 provides numerous benefits relative to at least some known PSC motor control systems. By enabling drive circuit operation at partial loads and line operation a full load, control system 100 enables more efficient operation of PSC motor 102 at all frequency ranges. Additionally, control system 100 always leaves first capacitor 110 coupled to AC line voltage source 118, which may become necessary if multiple different loads will share common circuit components, as described in more detail herein. Further, it enables a reduction in the number of connections. Moreover, the selective coupling of start winding 108 to third phase output 144 or to first capacitor 110 using relay 146 provides several additional benefits. First, shorting of first capacitor 110 is no longer necessary to when operating in drive mode to achieve variable speed control. Second, a potential for occurrence of a short circuit if relay 146 is moved to the wrong position is removed. A connection across start winding 108 second side 142 exists regardless of the position of relay 146. Third, a direct short circuit between inverter phases is no longer required to apply the three-phase output of inverter 120 to the two-phase PSC motor 102. Fourth, control system 100 does not require any additional sensing or use of a complex timing diagram for controlling relay 146.

Figure 2:
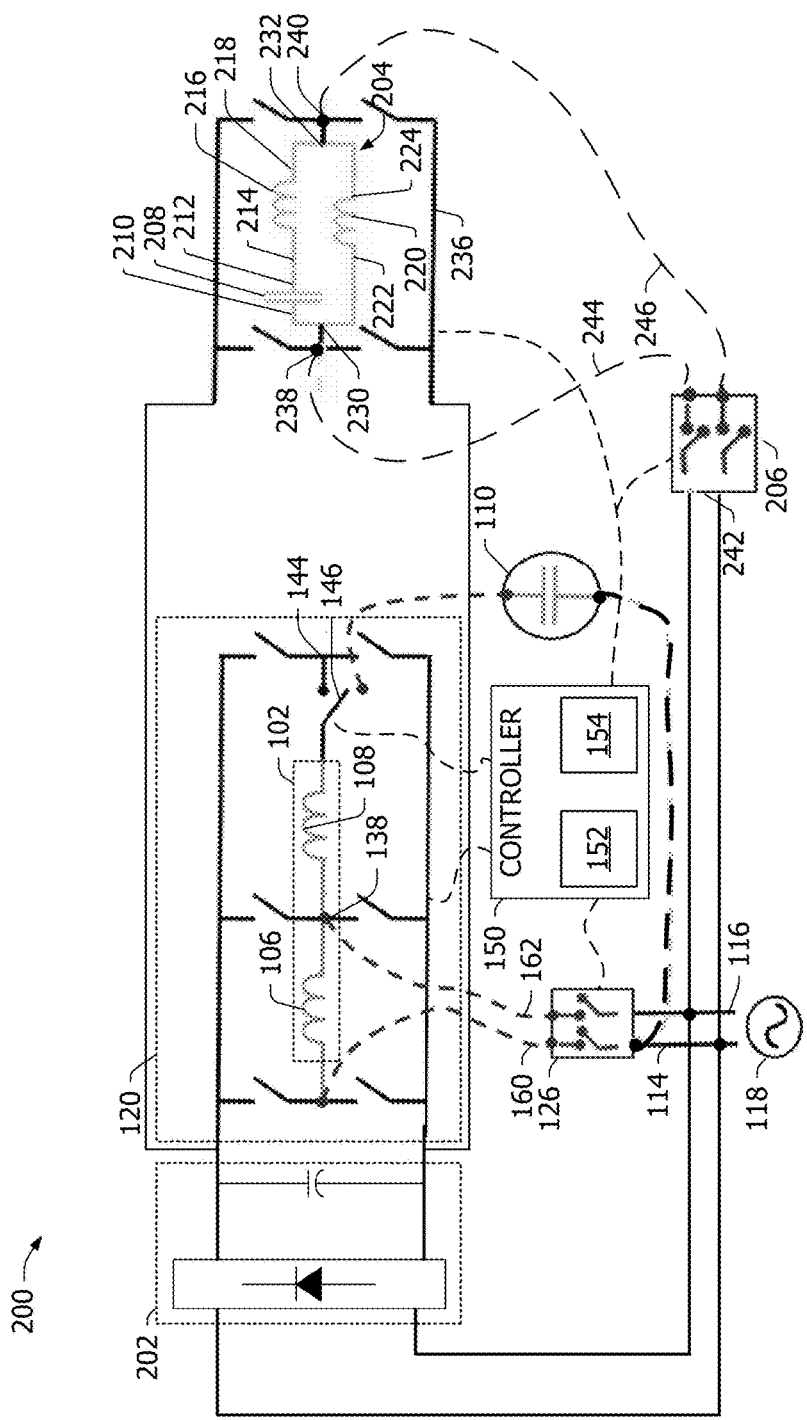
FIG. 2 is a circuit diagram of an exemplary dual-drive motor system that incorporates the control system and the PSC motor shown in FIG. 1.

FIG. 2 is a circuit diagram of an exemplary dual-drive motor system 200 that may use control system 100 (shown in FIG. 1) and PSC motor 102 (shown in FIG. 1). In the exemplary embodiment, dual-drive motor system 200 includes a shared front-end motor drive circuit 202 that combines common components of a compressor motor drive circuit and a condenser motor drive circuit. More specifically, in the exemplary embodiment, dual-drive motor system 200 includes shared front-end motor drive circuit 202, PSC motor 102 having a first control system 100, a condenser fan motor 204 having a second control system 206, and controller 150.

In the exemplary embodiment, first control system 100 is loaded by PSC motor 102, which has a power capability between about 1.5 HP~7.5 HP, and second control system 206 is loaded by condenser fan motor 204, which has a power capability of about ⅓ HP.

In the exemplary embodiment, shared front-end motor drive circuit 202 includes rectifier 112 and DC link capacitor 124 coupled across DC link 122 (all shown in FIG. 1). The functions of rectifier 112 and DC link capacitor 124 are the same as described with reference to FIG. 1 and their descriptions will not be repeated herein.

In the exemplary embodiment, first control system 100 for PSC motor 102 includes inverter 120, a main switch device 126 configured to selectively couple the AC line voltage to PSC motor 102, and relay 146 configured to selectively couple start winding 108 to the third phase output 142 of inverter 120 by controller 150. First control system 100 is the same as described with reference to FIG. 1 and its description will not be repeated herein.

Second control system 206 is configured to control condenser fan motor 204. In the exemplary embodiment, condenser fan motor 204 is a two-phase PSC motor that is independently controlled relative to PSC motor 102 by controller 150. Condenser fan motor 204 includes a second capacitor 208 having a first side 210 and a second side 212 that is series-coupled to a first side 214 of start winding 216, the combination of which is coupled in electrical parallel to a main winding 220. More specifically, second capacitor 208 first side 210 and a first side 222 of main winding 220 are coupled together at a first input 230 of condenser fan motor 204, and start winding 216 second side 218 and a second side 224 of main winding 220 are coupled together at a second input 232.

Second control system 206 includes an inverter 236 that includes a set of inverter switches for each of the two phases, a first phase output 238, and a second phase output 240. First phase output 238 is coupled to first input 230 of condenser fan motor 204, and second phase output 240 is coupled to second input 232. Inverter 236 is configured to receive DC link voltage output by shared front-end motor drive circuit 202 and output two-phase AC voltage according to command signals received from controller 150. Second control system 206 is configured to run condenser fan motor 204 through inverter 236 when there is partial-loading, which enables variable speed operation of condenser fan motor 204.

Second control system 206 also includes a second switch device 242 coupled to first and second input terminals 114 and 116 of AC line voltage source 118, and is coupled in parallel to the output of inverter 236. More specifically, second switch device 242 is coupled to first and second input terminals 114 and 116 on an input side, and further includes first and second output terminals 244 and 246 coupled to first and second inputs 230 and 232, respectively, of condenser fan motor 204. In the exemplary embodiment, second switch device 242 may either be a two-pole contactor or a two-pole triac.

When condenser fan motor 204 is fully-loaded, it is desired to operate condenser fan motor 204 on AC line voltage at 60 Hz. Controller 150 closes second switch device 242 to couple AC voltage source 118 directly to first and second inputs 230 and 232 of condenser fan motor 204.

In the exemplary embodiment, controller 150 is programmed to control operation of both PSC motor 102 and condenser fan motor 204 of dual-drive motor system 200. More specifically, controller 150 is operable to perform current control and pulse-width modulated (PWM) signal generation for PSC motor 102 and condenser fan motor 204. In alternative embodiments, PSC motor 102 and condenser fan motor 204 may have separate controllers.

In some embodiments, dual-drive motor system 200 additionally includes one or more blower motors and one or more associated blower motor drive circuits. In such implementations, system 200 is a hybrid triple or "trio" motor system. Each of the one or more blower motor drive circuits include similar components and operate similarly to condenser fan inverter 236.

In another embodiment, dual-drive motor system 200 may be used in an air conditioning system that includes a heat pump adding heating capability to the typical cooling system, a reversing valve that directs a flow of coolant between indoor and outdoor coils, and an expansion valve. In the exemplary embodiment, the PSC motor may be one of dual-drive motor system 200. When using the heat pump, a reversing valve is used for directional changes only. In both heat pump and cooling modes, an expansion valve is used to relieve pressure.

Figure 3:
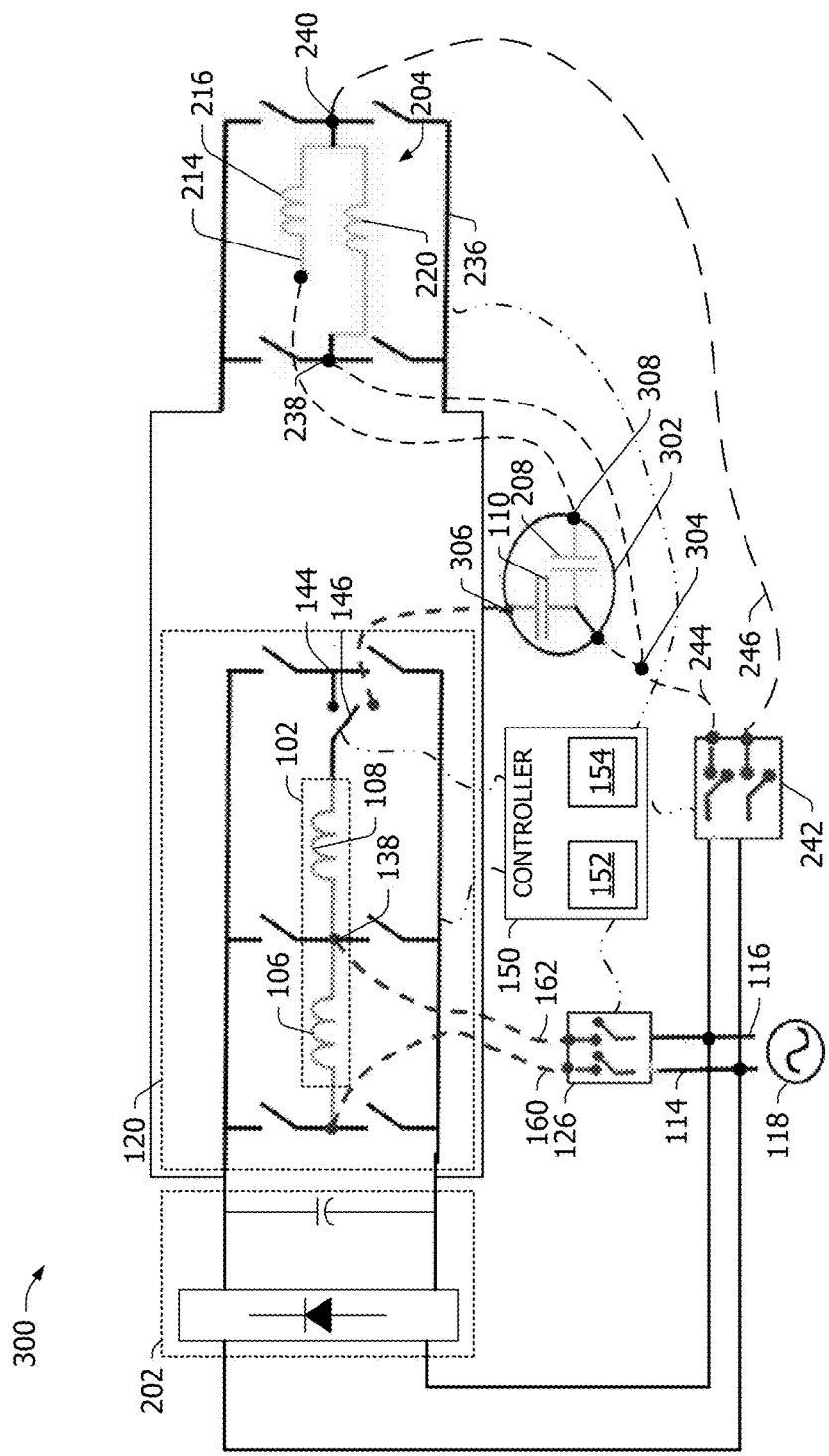
FIG. 3 is a circuit diagram of an exemplary dual-drive motor system that incorporates the control system and the PSC motor shown in FIG. 1.

FIG. 3 is an exemplary embodiment of a dual-drive motor system 300. In the exemplary embodiment, system 300 is similar to dual-drive motor system 200 (shown in FIG. 2) except that second capacitor 208 of condenser fan motor has been remove from the motor circuit and provided within a single, shared run capacitor device 302. Shared run capacitor device 302 includes a common input terminal 304, a first output terminal 306 that couples to compressor relay 146, and a second output terminal 308 that couples to first side 214 of start winding 216 of condenser fan motor 204.

First output terminal 244 of second switch device 242 is coupled to common input terminal 304 of shared run capacitor device 302 and is also coupled to first side 222 of main winding 220 of condenser fan motor 204. Second output terminal 246 of second switch device 242 is coupled to second input 232 of condenser fan motor 204.

The use of shared run capacitor device 302 facilitates shared control of providing AC voltage to run capacitors 110 and 208 using second switch device 242. It is generally more likely that a reduction of speed of the compressor motor will occur than a reduction of speed of the condenser fan, so the compressor motor takes precedence over the condenser fan regarding connection of shared run capacitor device 302.

Figure 4:
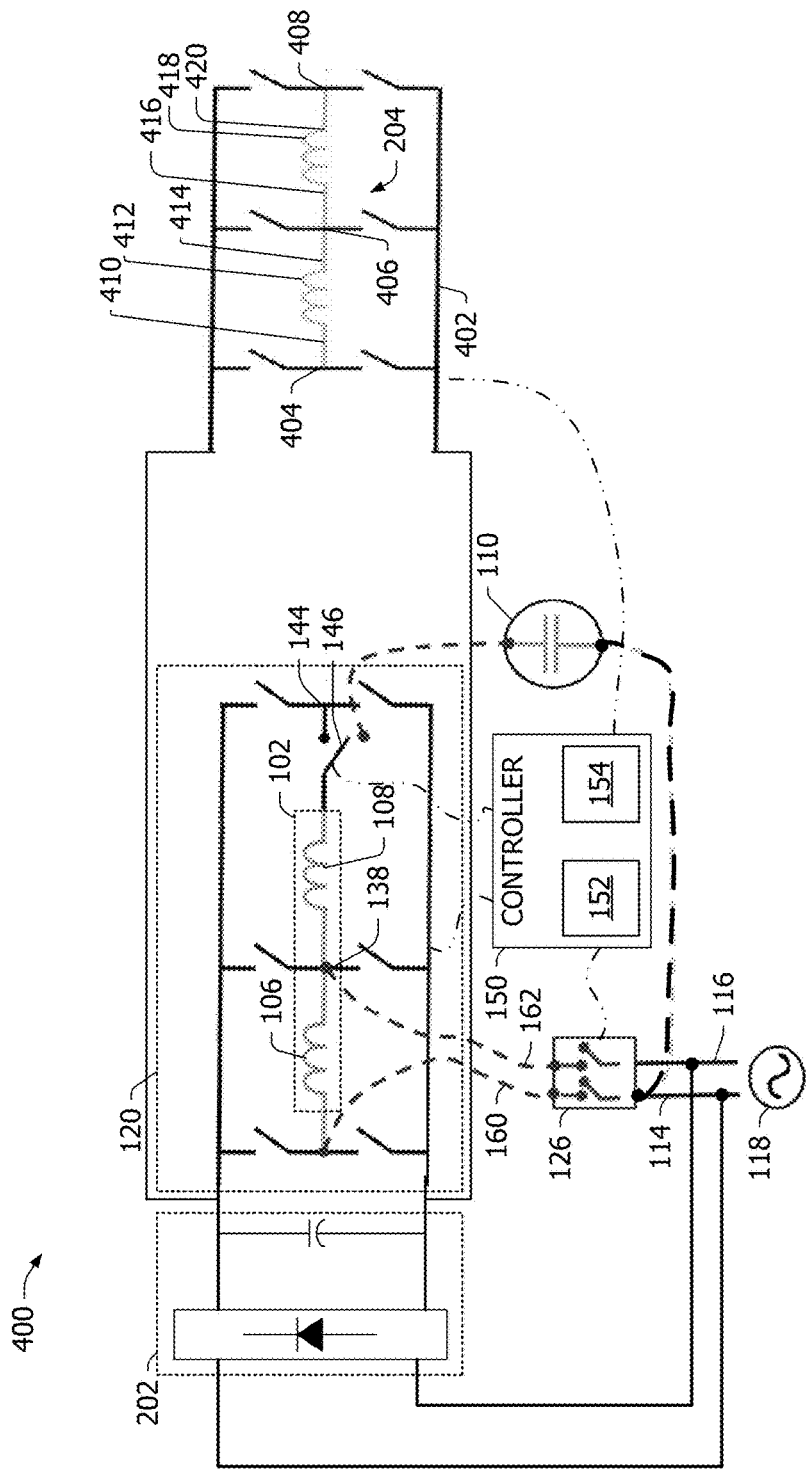
FIG. 4 is a circuit diagram of an exemplary dual-drive motor system that incorporates the control system and the PSC motor shown in FIG. 1.

FIG. 4 is an exemplary embodiment of a dual-drive motor system 400. System 400 is similar to dual-drive motor system 200 (shown in FIG. 2) and components of system 400 identical to components of system 200 shown in FIG. 2 are identified in FIG. 4 using the same reference numerals as used in FIG. 2. In the exemplary embodiment, condenser fan motor 204 includes a two-phase PSC motor.

Condenser fan motor 204 includes an inverter 402 configured to be coupled to condenser fan motor 204. Inverter 402 is a three-phase DC-AC voltage source inverter. Inverter 402 is configured to receive control signals from controller 150 and supply condenser fan motor 204 with conditioned AC voltage accordingly.

In the exemplary embodiment, inverter 402 is a three-phase inverter and includes a set of inverter switches for each of the three phases. More specifically, inverter 402 includes a first phase output 404, a second phase output 406, and a third phase output 408. A first side 410 of a main winding 412 of condenser fan motor 204 is coupled to first phase output 404. A second side 414 of main winding 412 and a first side 416 of a start winding 418 are both coupled to second phase output 406, and a second side 420 of start winding 418 is coupled to third phase output 408.

Controller 150 controls operation of PSC motor 102 as previously described, and controls operation of condenser fan motor 204. More specifically, controller 150 outputs PWM signals to controls the switches of inverter 402 to drive condenser fan motor 204 at a desired speed.

Figure 5:
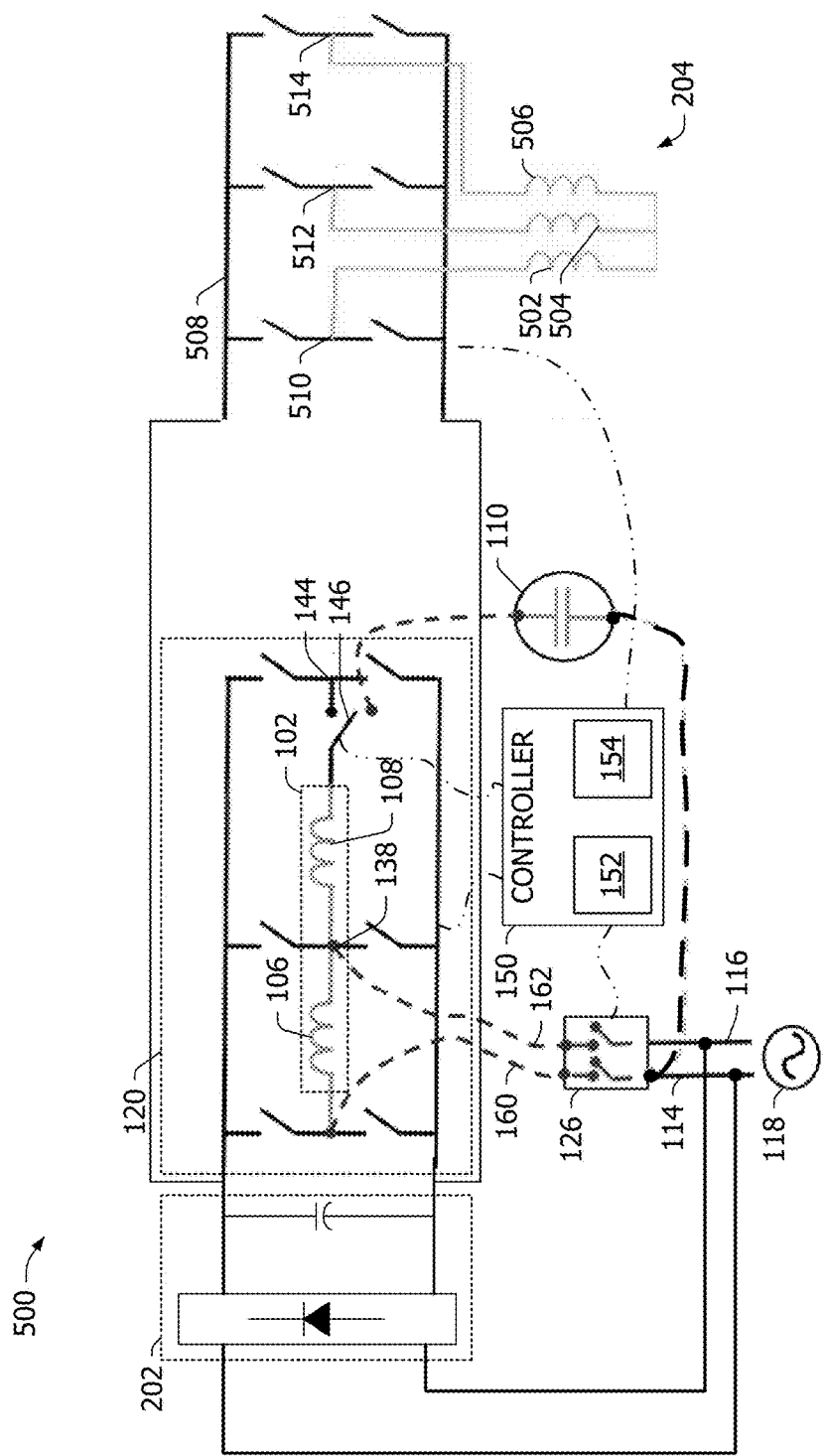
FIG. 5 is a circuit diagram of an exemplary dual-drive motor system that incorporates the control system and the PSC motor shown in FIG. 1.

FIG. 5 is an exemplary embodiment of a dual-drive motor system 500. System 500 is similar to dual-drive motor systems 200 and 400 (shown in FIGS. 2 and 4) and components of system 500 identical to components of systems 200 and 400 shown in FIGS. 2 and 4 are identified in FIG. 5 using the same reference numerals as used in FIGS. 2 and 4. In the exemplary embodiment, condenser fan motor 204 includes a three-phase motor, for example, a variable speed induction motor or an electronically commutated motor. Condenser fan motor 204 includes first, second, and third motor windings 502, 504, and 506.

Condenser fan motor 204 includes an inverter 508 configured to be coupled to condenser fan motor 204. Inverter 508 is a three-phase DC-AC voltage source inverter. Inverter 508 is configured to receive control signals from controller 150 and supply condenser fan motor 204 with conditioned AC voltage accordingly.

In the exemplary embodiment, inverter 508 is a three-phase inverter and includes a set of inverter switches for each of the three phases. More specifically, inverter 508 includes a first phase output 510, a second phase output 512, and a third phase output 514. First winding 502 of condenser fan motor 204 is coupled to first phase output 510, second winding 504 is coupled to second phase output 512, and third winding 506 is coupled to third phase output 514. A second side of first, second, and third motor windings 502, 504, and 506 are all commonly coupled together. However, motor configuration could be such that the winding pattern be altered from the traditional "Y" connection to a "Delta" connection pattern.

Controller 150 controls operation of PSC motor 102 as previously described, and controls operation of condenser fan motor 204. More specifically, controller 150 outputs PWM signals to controls the switches of inverter 508 to drive condenser fan motor 204 at a desired speed.

Figure 6:
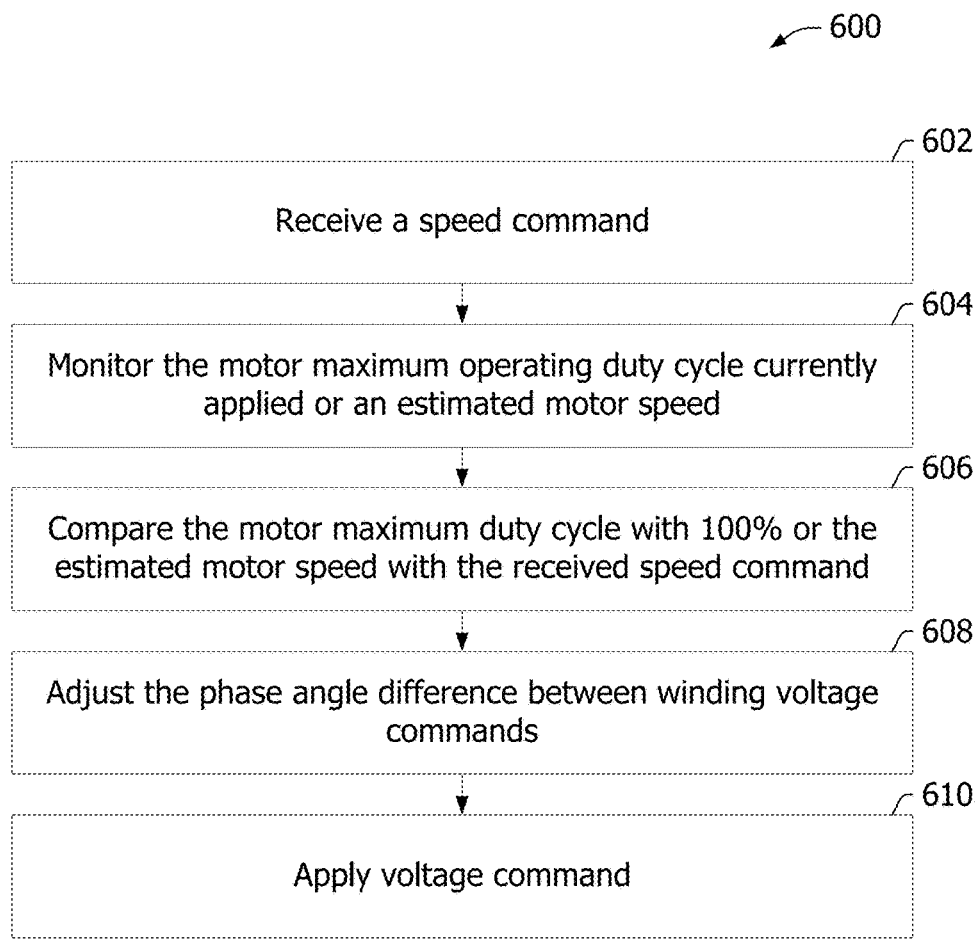
FIG. 6 is a flowchart of an exemplary method of controlling the condenser fan motor shown in FIGS. 4 and 5.

FIG. 6 is a flowchart of an exemplary method 600 of controlling condenser fan motor 204 (shown in FIGS. 4 and 5).

Typically, outdoor condenser fan PSC motors run at a single speed, and represent less than 10% of the total power used by an HVAC system operating at full load. However, at light or partial loads when the speed of the PSC motor is reduced, running a condenser fan motor at full speed may consume as much as 30% of the total power. Typically, the condenser fan motor speed can only be reduced by 20 to 35% in order to still provide sufficient airflow across the coils. A two-phase PSC motor typically uses a run capacitor to produce a 90° phase advance. As a consequence of having the capacitor in the circuit, the voltage across the start winding of the PSC motor is generally higher than the line input voltage; however, a three-phase inverter cannot deliver a large enough voltage/duty cycle to efficiently drive the two-phase PSC motor designed for line operation. This is because the inverter maximum voltage is typically limited to the peak of the AC voltage, and consequently the current in the motor windings does not produce adequate amounts of torque to reach full output. Some methods of solving this problem include changing the number of turns on the windings, but this would require use of an inverter to drive the PSC motor even at full loads. Control system 100 (shown in FIG. 1) avoids this by separating first capacitor 110 from the motor windings, which facilitates coupling PSC motor 102 or condenser fan motor 204 directly to AC voltage source 118 at full load for the most efficient operation of PSC motor 102. Controller 150 compensates for the insufficient voltage/duty cycle by using method 600 to automatically adjust a phase angle of the duty cycles of the inverter switches when inverter voltage is too low to provide rated main and start voltages. Controller 150 further reduces a speed of condenser fan motor 204 when a speed of PSC motor 102 is reduced, resulting in increased efficiency of up to 5% in SEER.

In the exemplary embodiment, method 600 includes receiving 602, by controller 150, a speed command for operating condenser fan motor 204. The speed command may be received from a system controller, a thermostat, or the like. Controller 150 monitors and stores 604 a motor maximum operating duty cycle applied to inverter 402 or 508 in memory device 154.

Controller 150 then compares 606 the stored applied motor maximum duty cycle with a 100% duty cycle, or compares the estimated motor speed with the received motor command. Based on the comparisons, the controller determines if there is a need to adjust the phase difference between main and start winding command voltages to meet the speed command In one embodiment, the comparing 606 includes determining a difference between the stored applied motor maximum duty cycle and a 100% duty cycle. In another embodiment, the comparing 606 includes determining a difference between the commanded speed and the estimated speed of the motor with the received motor command.

Because condenser fan motor 204 does not use a run capacitor, there is nothing to keep the two motors phases separated by 90° for most efficient operation. Accordingly, based on the speed command and the compared duty cycle information, or the comparison between the received commanded speed and the estimated speed, controller 150 adjusts 608 a phase angle difference between winding voltage commands. More specifically, controller 150 electronically adjusts a phase lag of the duty cycles of the inverter switches for each of the three inverter phases such that their operation is evenly timed and distributed for driving the two-phase condenser fan motor 204.

Controller 150 then applies 610 a voltage command to the inverter switches that includes the adjusted phase angles. In one embodiment, controller 150 then returns to step 604 and continuously repeats the process to maintain the most efficient operation of condenser fan motor 204. Additionally or alternatively, controller 150 receives a new speed command at step 602 and repeats method 600.

Figure 7:
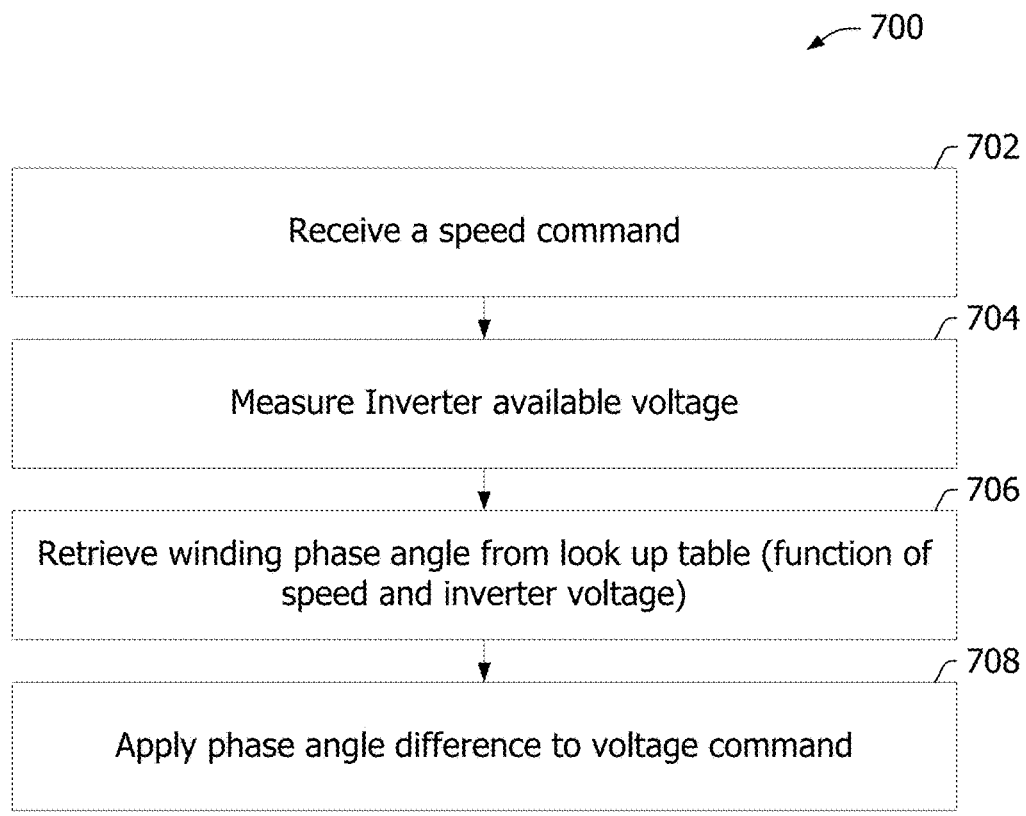
FIG. 7 is a flowchart of an exemplary method of controlling the condenser fan motor shown in FIGS. 4 and 5.

FIG. 7 is a flowchart of an exemplary method 700 of controlling condenser fan motor 204 (shown in FIGS. 4 and 5).

In the exemplary embodiment, method 700 includes receiving 702, by controller 150, a speed command for operating condenser fan motor 204. The speed command may be received from a system controller, a thermostat, or the like.

Controller 150 then measures 704 available voltage on the inverter, for example inverter 402 or 508. Using the measured available voltage and the received speed command, controller 150 determines 706 a winding phase angle. In the exemplary embodiment, controller 150 retrieves the winding phase angle by accessing a look-up table stored on memory device 154. The winding phase angles are functions of speed and available inverter voltage. Controller 150 applies 708 the determined phase angle difference in a voltage command that drives the inverter.

Figure 8:
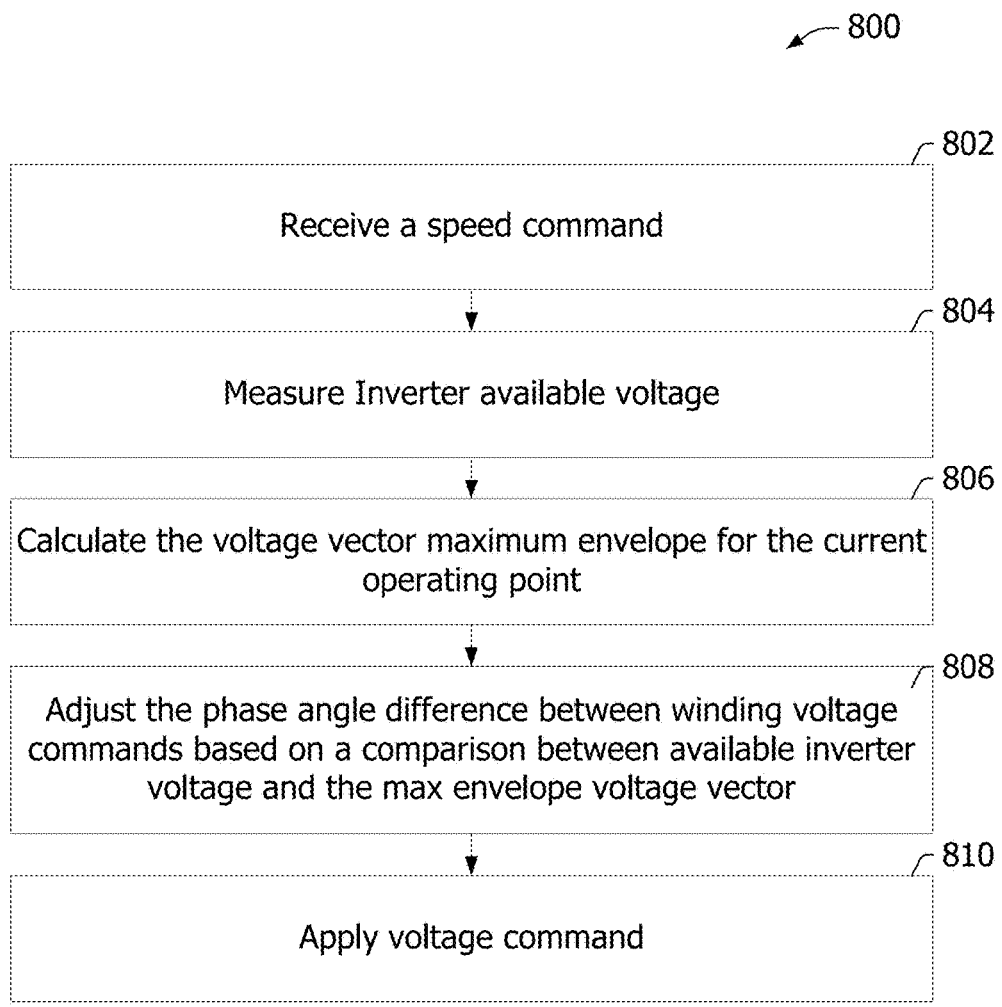
FIG. 8 is a flowchart of an exemplary method of controlling the condenser fan motor shown in FIGS. 4 and 5.

FIG. 8 is a flowchart of an exemplary method of controlling condenser fan motor 204 (shown in FIGS. 4 and 5).

In the exemplary embodiment, method 800 includes receiving 802, by controller 150, a speed command for operating condenser fan motor 204. The speed command may be received from a system controller, a thermostat, or the like. Controller 150 then measures 804 available voltage on the inverter, for example inverter 402 or 508.

Using the measured available voltage, controller 150 calculates 806 a voltage vector maximum envelope for the current voltage operating point of the motor. The voltage envelope consists of the vector calculation of the usage of the inverter voltage over a complete electrical cycle of a motor revolution. As the rotor position evolves during rotation, so does the voltage applied to the main and start windings of the motor. The algorithm realizes the vectorial sum of the main winding voltage and the start winding voltage and determines the maximum point over one electrical cycle for the current phase angle between the main and start winding voltages.

Based on the comparison between the available inverter voltage and the maximum envelope voltage vector, controller 150 then adjusts 808 a phase angle difference and applies 810 the determined phase angle difference in a voltage command that drives the inverter.

Figure 9:
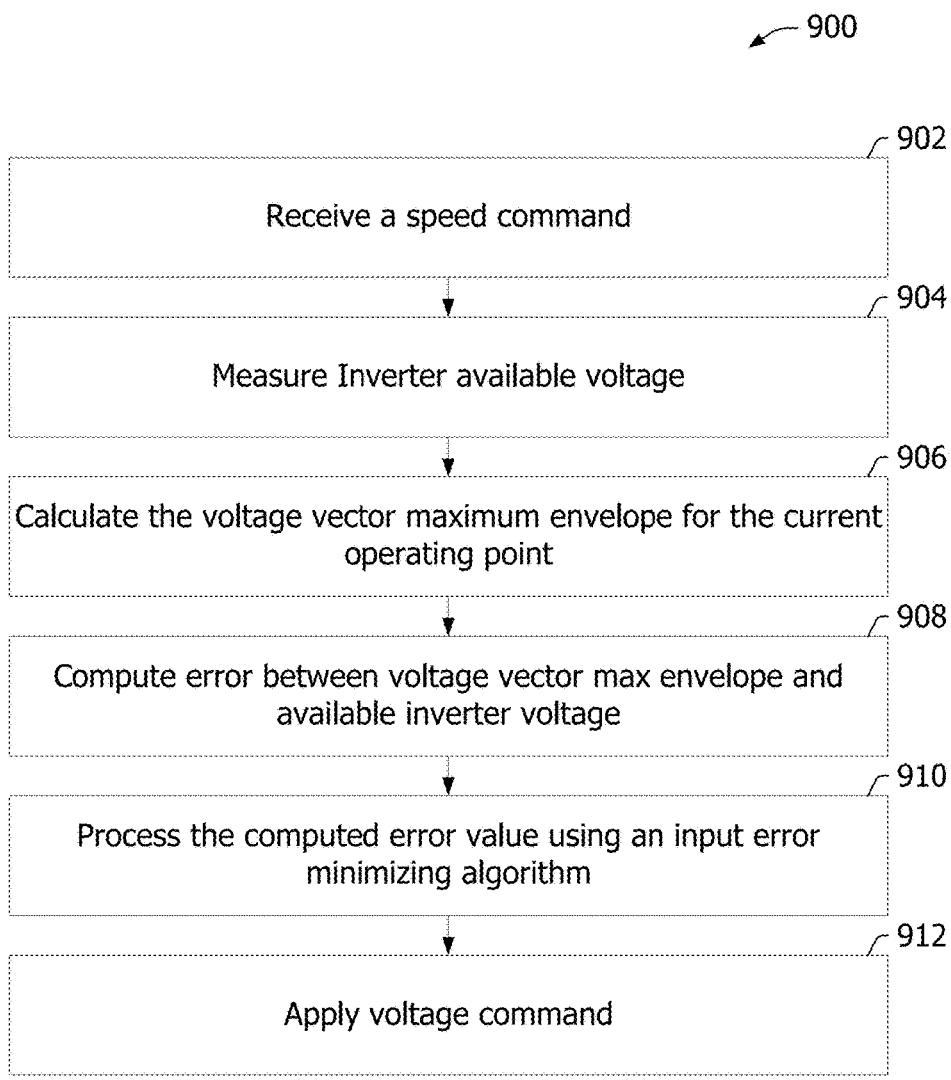
FIG. 9 is a flowchart of an exemplary method of controlling the condenser fan motor shown in FIGS. 4 and 5.

FIG. 9 is a flowchart of an exemplary method of controlling condenser fan motor 204 (shown in FIGS. 4 and 5).

In the exemplary embodiment, method 900 includes receiving 902, by controller 150, a speed command for operating condenser fan motor 204. The speed command may be received from a system controller, a thermostat, or the like. Controller 150 then measures 904 available voltage (Vinv) on the inverter, for example inverter 402 or 508.

Controller 150 then calculates 906 a voltage vector maximum envelope for the current voltage operating point of the motor (Vm). The voltage envelope consists of the vector calculation of the usage of the inverter voltage over a complete electrical cycle of a motor revolution. As the rotor position evolves during rotation, so does the voltage applied to the main and start windings of the motor. The algorithm realizes the vectorial sum of the main winding voltage and the start winding voltage and determines the maximum point over one electrical cycle for the current phase angle between the main and start winding voltages. An error value DV is then computed 908 between the voltage vector max envelope Vm and the available inverter voltage Vinv.

The error value DV is then processed 910 using a PI controller (or any other control algorithm suitable) to determine a phase angle difference to be applied between main and start winding voltages. The PI controller thereby minimizes the phase angle difference between main and start winding voltages that satisfies operation of the motor within the limit of the available inverter voltage Controller 150 applies 912 the determined phase angle difference in a voltage command that drives the inverter.

Methods 600, 700, 800, and 900 (shown in FIGS. 6-9) enable use of an existing PSC condenser fan motor with a motor drive circuit such that variable speed may be achieved between 0% and 100% full speed. Such operation enables an increase of system efficiency by up to 5% in SEER. This is accomplished by using the PSC condenser fan motor without the run capacitor. A three-phase inverter achieves variable speed operation, and a controller electronically shifts a phase angle difference between inverter phases to reach all speeds between 40 Hz and 60 Hz. The design of the fixed speed condenser fan motor remains unchanged and becomes suitable for both fixed and variable speed operation, while increasing efficiency. Such methods also enable soft-starting of the condenser fan motor.

A technical effect of the methods and systems described herein may include one or more of: (a) increasing power factor; (b) reducing EMI; (c) increasing efficiency; (d) enabling efficient fixed and variable speed operation of a PSC motor based on a loading on the PSC motor; and (e) enabling efficient control and operation of dual-drive electric motor systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dual-drive electric motor control system configured to drive a first electric motor and a second electric motor, said electric motor control system comprising:
   a shared front-end motor drive circuit configured to convert AC input voltage from an AC voltage source to a DC-link voltage;
   a first control system comprising:
      a first inverter coupled to said shared front-end motor drive circuit, said first inverter configured to generate a first conditioned output voltage to drive the first electric motor using the DC-link voltage; and a first switch device configured to couple the AC input voltage from the AC voltage source directly to the first electric motor,
wherein said first control system is configured to operate the first electric motor using said first inverter when the first electric motor is partially loaded, and couple the first electric motor directly to the AC voltage source when the first electric motor is fully loaded; and
a second control system comprising:
a second inverter coupled to said shared front-end motor drive circuit, said second inverter configured to generate a second conditioned output voltage to drive the second electric motor using the DC-link voltage; and
a second switch device configured to couple the AC input voltage from the AC voltage source directly to the second electric motor.

2. The electric motor control system of claim 1, wherein said first inverter is a three-phase inverter and comprises a first phase output, a second phase output, and a third phase output.

3. The electric motor control system of claim 1, wherein said first control system further comprises a relay configured to selectively couple a first winding of the first electric motor to one of said third phase output or to the AC voltage source via a first capacitor.

4. The electric motor control system of claim 3, wherein said relay includes one of an electromechanical relay, an arrangement of TRIACs, an arrangement of SCRs, and a solid state relay.

5. The electric motor control system of claim 1, further comprising a controller configured to independently control said first control system and said second control system.

6. The electric motor control system of claim 5, wherein said controller is further configured to:
couple the first electric motor to one of said first inverter or the AC voltage source based on a loading on the first electric motor; and
couple the second electric motor to one of said second inverter or the AC voltage source based on a loading on the second electric motor.

7. The electric motor control system of claim 1, wherein the first electric motor is a compressor motor and the second electric motor is a condenser fan motor in a heating, ventilation, and air conditioning (HVAC) system.

8. The electric motor control system of claim 1, wherein said second control system is configured to:
operate the second electric motor using said second inverter when the second electric motor is partially loaded; and
couple the second electric motor directly to the AC voltage source when the second electric motor is fully loaded.

9. The electric motor control system of claim 1, wherein said shared front-end motor drive circuit comprises:
a rectifier configured to convert an AC input voltage to a substantially DC voltage; and
a DC link electrically coupled to said rectifier, said DC-link comprising a DC-link capacitor.

10. A dual-drive electric motor control system configured to drive a first electric motor and a second electric motor, wherein the second electric motor includes a first input comprising a first side of a second capacitor series-coupled to a first winding and a first side of a second winding coupled in electrical parallel to the first side of the series-coupled second capacitor and start winding, and a second input comprising a second side of the series-coupled second capacitor and first winding and a second side of the main winding coupled in electrical parallel to the second side of the series-coupled second capacitor and first winding, said electric motor control system comprising:
a shared front-end motor drive circuit configured to convert AC input voltage from an AC voltage source to a DC-link voltage;
a first control system comprising:
a first inverter coupled to said shared front-end motor drive circuit, said first inverter configured to generate a first conditioned output voltage to drive the first electric motor using the DC-link voltage; and
a first switch device configured to couple the AC input voltage from the AC voltage source directly to the first electric motor;
a second control system comprising:
a second inverter coupled to said shared front-end motor drive circuit, said second inverter configured to generate a second conditioned output voltage to drive the second electric motor using the DC-link voltage; and
a second switch device configured to couple the AC input voltage from the AC voltage source directly to the second electric motor.

11. The electric motor control system of claim 10, wherein said second inverter is a two-phase inverter and comprises:
a first phase output coupled to the first input; and
a second phase output coupled to the second input.

12. The electric motor control system of claim 10, wherein said second switch device comprises:
a first output terminal configured to be coupled to a first input terminal of the AC line voltage source and to the first input of the second electric motor; and
a second output terminal configured to be coupled to a second input terminal of the AC line voltage source and to the second input of the second electric motor.

13. The electric motor control system of claim 10, wherein the second electric motor is a two-phase permanent split capacitor motor.

14. A dual-drive electric motor control system configured to drive a first electric motor and a second electric motor, said electric motor control system comprising:
a shared front-end motor drive circuit configured to convert AC input voltage from an AC voltage source to a DC-link voltage;
a first control system comprising:
a first inverter coupled to said shared front-end motor drive circuit, said first inverter configured to generate a first conditioned output voltage to drive the first electric motor using the DC-link voltage; and
a first switch device configured to couple the AC input voltage from the AC voltage source directly to the first electric motor;
a second control system comprising:
a second inverter coupled to said shared front-end motor drive circuit, said second inverter configured to generate a second conditioned output voltage to drive the second electric motor using the DC-link voltage; and
a second switch device configured to couple the AC input voltage from the AC voltage source directly to the second electric motor; and
a shared capacitor device comprising:
a common input terminal coupled to a first output terminal of said second switch device;

a first capacitor device output terminal configured to be selectively coupled to a relay of the first electric motor; and a second capacitor device output terminal coupled to a first winding of the second electric motor.

15. The electric motor control system of claim 14, wherein said second inverter comprises:

a first phase output coupled to said second capacitor device output terminal and to a first side of a second winding of the second electric motor; and a second phase output coupled to a second output terminal of said second switch device and to commonly-coupled second sides of the first and second windings of the second electric motor.

16. A dual-drive electric motor control system configured to drive a first electric motor and a second electric motor, said electric motor control system comprising:

a shared front-end motor drive circuit configured to convert AC input voltage from an AC voltage source to a DC-link voltage;

a first control system comprising:
  a first inverter coupled to said shared front-end motor drive circuit, said first inverter configured to generate a first conditioned output voltage to drive the first electric motor using the DC-link voltage; and
  a first switch device configured to couple the AC input voltage from the AC voltage source directly to the first electric motor;

a second control system comprising:
  a second inverter coupled to said shared front-end motor drive circuit, said second inverter configured to generate a second conditioned output voltage to drive the second electric motor using the DC-link voltage, said second inverter comprising:
    a first phase output coupled to a first side of a second winding of the second electric motor;
    a second phase output coupled to a second side of the second winding and a first side of a first winding of the second electric motor; and
    a third phase output coupled to a second side of the first winding of the second electric motor; and a second switch device configured to couple the AC input voltage from the AC voltage source directly to the second electric motor.

17. The electric motor control system of claim 16, wherein the second electric motor is a two-phase permanent split capacitor motor.

18. A dual-drive electric motor control system configured to drive a first electric motor and a second electric motor, said electric motor control system comprising:

a shared front-end motor drive circuit configured to convert AC input voltage from an AC voltage source to a DC-link voltage;

a first control system comprising:
  a first inverter coupled to said shared front-end motor drive circuit, said first inverter configured to generate a first conditioned output voltage to drive the first electric motor using the DC-link voltage; and
  a first switch device configured to couple the AC input voltage from the AC voltage source directly to the first electric motor;

a second control system comprising:
  a second inverter coupled to said shared front-end motor drive circuit, said second inverter configured to generate a second conditioned output voltage to drive the second electric motor using the DC-link voltage, said second inverter comprising:
    a first phase output coupled to a first side of a first winding of the second electric motor;
    a second phase output coupled to a first side of a second winding of the second electric motor; and
    a third phase output coupled to a first side of a third winding of the second electric motor,
    wherein respective second sides of the first, second, and third windings are coupled together; and
  a second switch device configured to couple the AC input voltage from the AC voltage source directly to the second electric motor.

19. The electric motor control system of claim 18, wherein the second electric motor is a three-phase motor including one of a variable speed induction motor or permanent magnet synchronous motor.

* * * * *